(12) United States Patent
Kidachi (10) Patent No.: US 11,044,856 B2
(45) Date of Patent: Jun. 29, 2021

(54) EMITTER AND DRIP IRRIGATION TUBE (71) Applicant: Enplas Corporation, Saitama (JP)

(72) Inventor: Masahiro Kidachi, Saitama (JP)

(73) Assignee: ENPLAS CORPORATION, Saitama (JP)

( * ) Notice: Subject to any disclaimer, the term of this patent is extended or adjusted under 35 U.S.C. 154(b) by 0 days.

(21) Appl. No.: 15/755,564

(22) PCT Filed: Jul. 20, 2016

(86) PCT No.: PCT/JP2016/071272
§ 371 (c)(1),
(2) Date: Feb. 27, 2018

(87) PCT Pub. No.: WO2017/033627
PCT Pub. Date: Mar. 2, 2017

(65) Prior Publication Data
US 2018/0192598 A1 Jul. 12, 2018

(30) Foreign Application Priority Data
Aug. 27, 2015 (JP) .............................. JP2015-167504

(51) Int. Cl.
*A01G 25/02* (2006.01)
(52) U.S. Cl.
CPC ........... *A01G 25/02* (2013.01); *A01G 25/023* (2013.01); *Y02A 40/22* (2018.01)
(58) Field of Classification Search
CPC ..... Y02A 40/237; A01G 25/023; A01G 25/02
USPC ....................................................... 239/542
See application file for complete search history.

(56) References Cited

U.S. PATENT DOCUMENTS

| 6,027,048 | A | 2/2000 | Mehoudar |
| 6,206,305 | B1 | 3/2001 | Mehoudar |
| 2010/0155508 | A1 | 6/2010 | Keren |
| 2010/0282873 | A1* | 11/2010 | Mattlin ................ A01G 25/023 239/542 |

(Continued)

FOREIGN PATENT DOCUMENTS

| FR | 2525496 A1 | 10/1983 |
| JP | 2010-046094 A | 3/2010 |

(Continued)

OTHER PUBLICATIONS

International Search Report from International Application No. PCT/JP2016/071272 dated Aug. 16, 2016.

(Continued)

*Primary Examiner* — Tuongminh N Pham
(74) *Attorney, Agent, or Firm* — Brundidge & Stanger, P.C.

(57) ABSTRACT

An emitter (120) adjusts the flow rate of a liquid for irrigation to be discharged from a discharge opening (112) of a tube (110) so that, according to pressure of the liquid for irrigation within the tube (110) received by a second membrane (153), the flow rate is made smaller as the pressure becomes greater in a prescribed range of pressure. The emitter (120) is constituted by mating a first member (130) having a bottom surface with a shape that follows along the inside wall surface of the tube (110) and a second member (150) that includes the second membrane (153) and is mated to the first member (130).

4 Claims, 7 Drawing Sheets

(56) References Cited

U.S. PATENT DOCUMENTS

2013/0248616 A1* 9/2013 Ensworth .............. B29C 48/155
 239/11
2016/0286740 A1 10/2016 Kidachi

FOREIGN PATENT DOCUMENTS

WO 2009/104183 A1 8/2009
WO 2015/080127 A1 6/2015

OTHER PUBLICATIONS

Extended European Search Report for EP16838974.0 dated Feb. 26, 2019.

* cited by examiner

EMITTER AND DRIP IRRIGATION TUBE

TECHNICAL FIELD

The present invention relates to an emitter and a drip irrigation tube including the emitter.

BACKGROUND ART

Conventionally, a drip irrigation method is known as a method for culturing plants. In the drip irrigation method, a drip irrigation tube is disposed on the soil where plants are planted, and irrigation liquid such as water and liquid fertilizer is dropped from the drip irrigation tube to the soil. The drip irrigation method has been increasingly attracting attention in recent years since the method can minimize the consumption rate of the irrigation liquid.

Normally, the drip irrigation tube includes a tube provided with a plurality of through holes for discharging irrigation liquid, and a plurality of emitters (also called "drippers") for discharging irrigation liquid from respective through holes. Emitters which are joined on the inner wall surface of a tube, and emitters which are pierced into the tube from the external side of the tube are known.

The former emitter includes, for example, a first member having an intake port for intake of irrigation liquid, a second member having a discharging port for discharging irrigation liquid, and a film member disposed between the first member and the second member. The emitter is configured by stacking the first member, the film member and the second member in this order, and when this emitter is joined on the inner wall surface of the tube, the combined first and second members are partially directly joined on the tube. In this emitter, when the intake port is opened and closed with the film member that moves toward or away from the valve seat part, the irrigation liquid enters the emitter and flows through a pressure reduction channel between the intake port and the discharging port, and is then discharged from the discharging port (see, for example, PTL 1).

CITATION LIST

Patent Literature

PTL 1
Japanese Patent Application Laid-Open No. 2010-046094

SUMMARY OF INVENTION

Technical Problem

However, the film member of the emitter disclosed in PTL 1 is a separate member independent from the first member and the second member, and has flexibility unlike the first member and the second member that do not have flexibility. Therefore, in general, the film member is formed with a resin different from the resin of the first member and the second member, and the resin of the film member is prepared by a route different from that of the first member and the second member. Consequently, the performance of the film members might be varied, and moreover, assembly errors of the three members are caused in some situation. As a result, it is difficult to enhance the yield. That is, the emitter disclosed in PTL 1 has a room for improvement in reduction in manufacturing errors.

An object of the present invention is to provide an emitter which can be stably produced with two or more components, and a drip irrigation tube including the emitter.

Solution to Problem

The present invention achieves the above-mentioned object with a configuration in which a film part is disposed integrally with a part of a member that is assembled to form an emitter.

Specifically, the present invention provides an emitter configured to be joined to an inner wall surface of a tube for carrying irrigation liquid at a position corresponding to a discharging port for communicating between inside and outside of the tube, the emitter being configured to quantitatively discharge the irrigation liquid in the tube from the discharging port to the outside of the tube, the emitter including: a liquid intake part configured for intake of the irrigation liquid in the tube; a pressure reduction channel part configured to form a pressure reduction channel configured to carry the irrigation liquid taken by the liquid intake part while reducing the pressure of the irrigation liquid; a discharge rate adjusting part including a film part, the film part being configured to receive a pressure of the irrigation liquid in the tube, the discharge rate adjusting part being configured to control a flow rate of the irrigation liquid supplied from the pressure reduction channel by the film part that is deformed by the pressure of the irrigation liquid in the tube; and a discharging part configured to house the irrigation liquid supplied from the discharge rate adjusting part, the discharging part being configured to face the discharging port. The emitter is configured with a first member including the discharging part and configured to be joined to the inner wall surface of the tube, and a second member including the film part and configured to be coupled to the first member, in which when the second member is coupled to the first member, the second member advances to a position where a part of the second member is to be joined to the inner wall surface of the tube, and the discharge rate adjusting part is formed when the second member is coupled with the first member.

In addition, the present invention provides a drip irrigation tube including: a tube including a discharging port configured to discharge irrigation liquid; and the above-mentioned emitter that is joined on an inner wall surface of the tube at a position corresponding to the discharging port.

Advantageous Effects of Invention

In the present invention, a film part is disposed integrally with a part of a main component of the emitter, and therefore it is possible to provide an emitter which can be stably produced with two or more components and a drip irrigation tube including the emitter.

DESCRIPTION OF EMBODIMENT

Figure 1A:
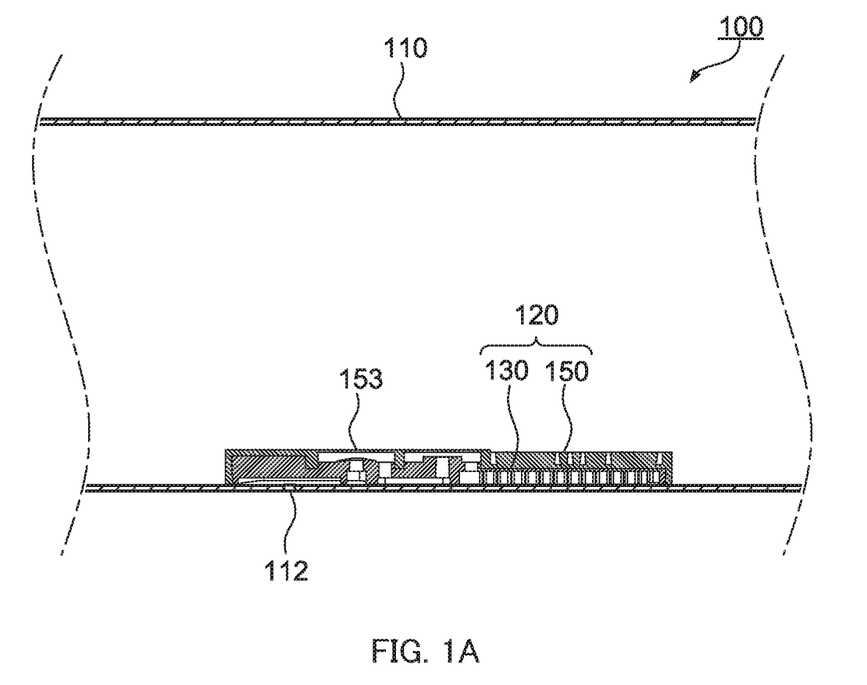
FIG. 1A is a sectional view along an axial direction of a drip irrigation tube according to an embodiment of the present invention.
Figure 1B:
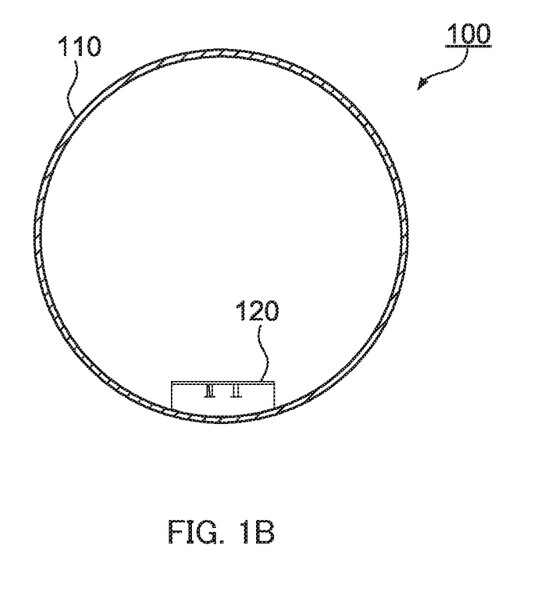
FIG. 1B is a sectional view of the drip irrigation tube in a direction perpendicular to the axial direction.

FIG. 1A is a sectional view along the axial direction of a drip irrigation tube according to an embodiment of the present invention, and FIG. 1B is a sectional view perpendicular to the axial direction of the drip irrigation tube. Drip irrigation tube 100 includes tube 110 including discharging port 112 for discharging irrigation liquid, and emitter 120 joined at a position corresponding to discharging port 112 of the inner wall surface of tube 110.

Tube 110 is a pipe for flow of irrigation liquid therethrough. The material of tube 110 is not limited. In the present embodiment, the material of tube 110 is polyethylene such as linear low density polyethylene and high density polyethylen. The cross-sectional shape and the cross-sectional area of tube 110 in the direction perpendicular to the axis direction can be appropriately set as long as emitter 120 can be installed inside tube 110. In the wall of tube 110, a plurality of discharging ports 112 for discharging irrigation liquid are formed at a predetermined interval (for example, 200 to 500 mm) in the axis direction of tube 110. The diameter of the opening of discharging port 112 can be appropriately set as long as the irrigation liquid can be discharged at a desired flow rate, and is, for example, 1.5 mm. Emitters 120 are joined at respective positions corresponding to discharging ports 112 on the inner wall surface of tube 110.

Emitter 120 is joined on the inner wall surface of tube 110. Emitter 120 is joined to tube 110 by a publicly known joining method, for example. Examples of the joining method include bonding with an adhesive agent, and welding and/or fusing of the resin material of emitter 120 or tube 110. Normally, discharging port 112 is formed after tube 110 and emitter 120 are joined to each other, and discharging port 112 may be formed before tube 110 and emitter 120 are joined to each other.

Figure 2A:
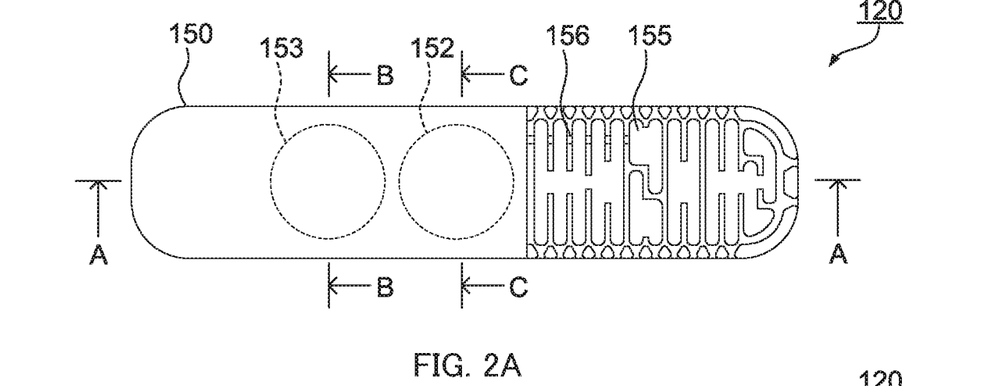
FIG. 2A is a plan view of an emitter according to the embodiment of the present invention.
Figure 2B:
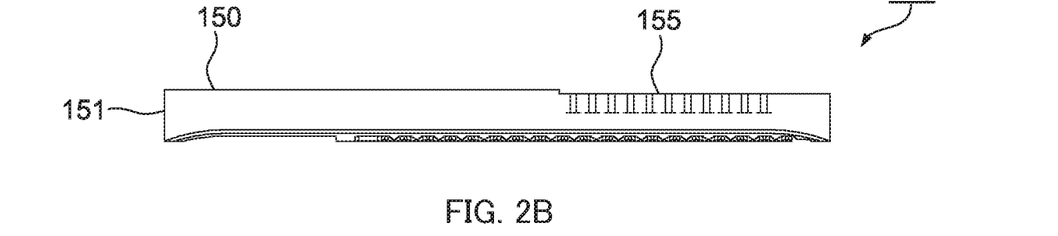
FIG. 2B is a front view of the emitter.
Figure 2C:
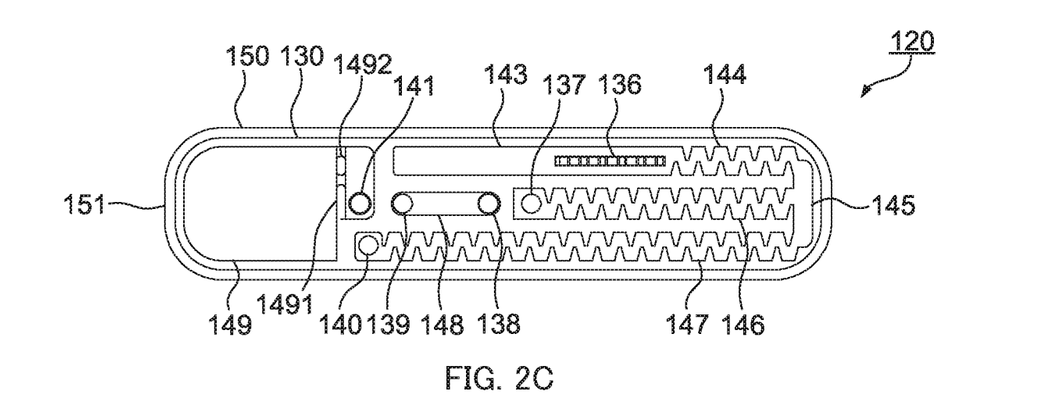
FIG. 2C is a bottom view of the emitter.
Figure 2D:
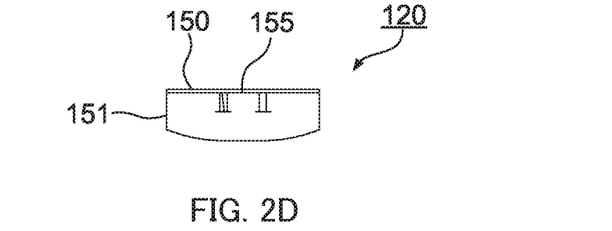
FIG. 2D is a right side view of the emitter.

FIG. 2A is a plan view of emitter 120, FIG. 2B is a front view of emitter 120, FIG. 2C is a bottom view of emitter 120, and FIG. 2D is a right side view of emitter 120. The size and the shape of emitter 120 can be appropriately set as long as a desired function can be ensured. For example, the planar shape of emitter 120 is a substantially rectangular shape with chamfered four corners, and emitter 120 has a long side length of 25 mm, a short side length of 8 mm, and a height of 2.5 mm.

Emitter 120 includes first member 130 and second member 150 combined with first member 130. First member 130 includes a convex surface (also referred to as "bottom surface") that matches the inner wall surface of tube 110. The bottom surface is a main portion of the joining part of emitter 120 to the inner wall surface. In tube 110, second member 150 is combined with first member 130 in such a manner as to cover first member 130, and includes a plane surface (also referred to as "top surface") located on the side opposite to the bottom surface. In the combined state, the periphery of second member 150 is located at a position where it can be joined to the inner wall surface. Each of first member 130 and second member 150 appropriately includes on the surface thereof a recess and a through hole for defining a channel described later and the like.

Figure 3A:
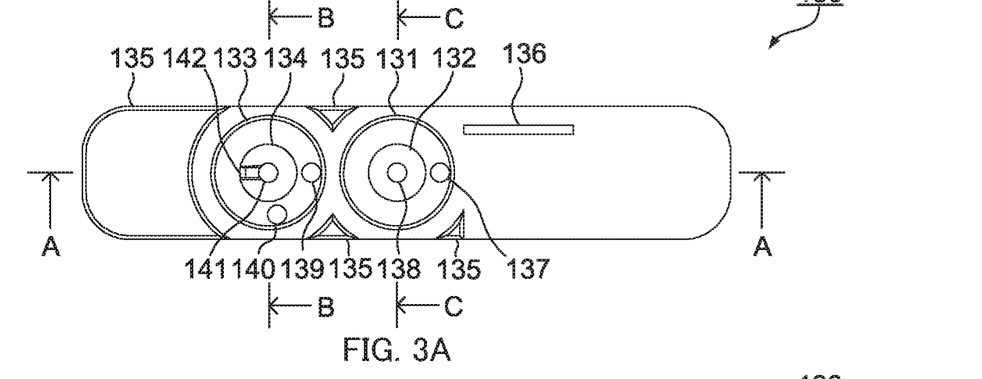
FIG. 3A is a plan view of a first member in the embodiment of the present invention.
Figure 3B:
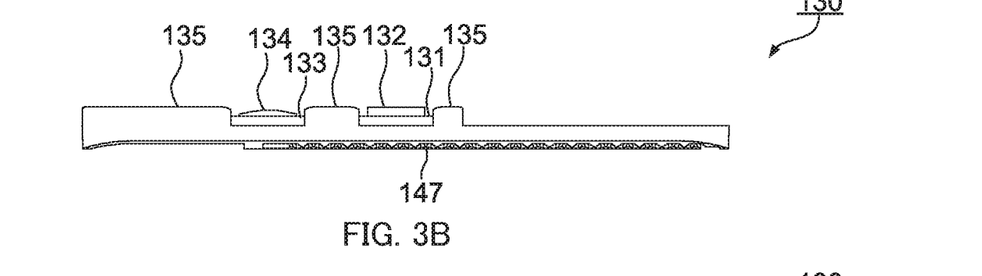
FIG. 3B is a front view of the first member.
Figure 3C:
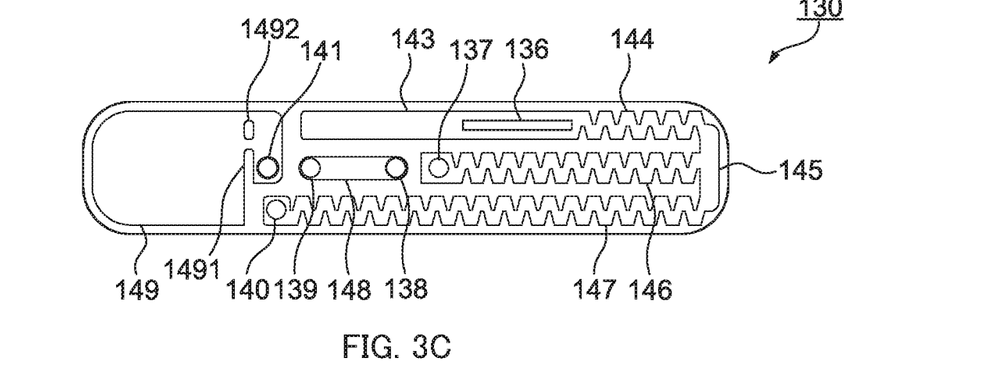
FIG. 3C is a bottom view of the first member.
Figure 3D:
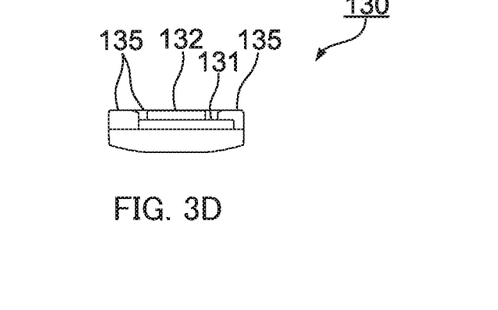
FIG. 3D is a right side view of the first member.
Figure 4A:
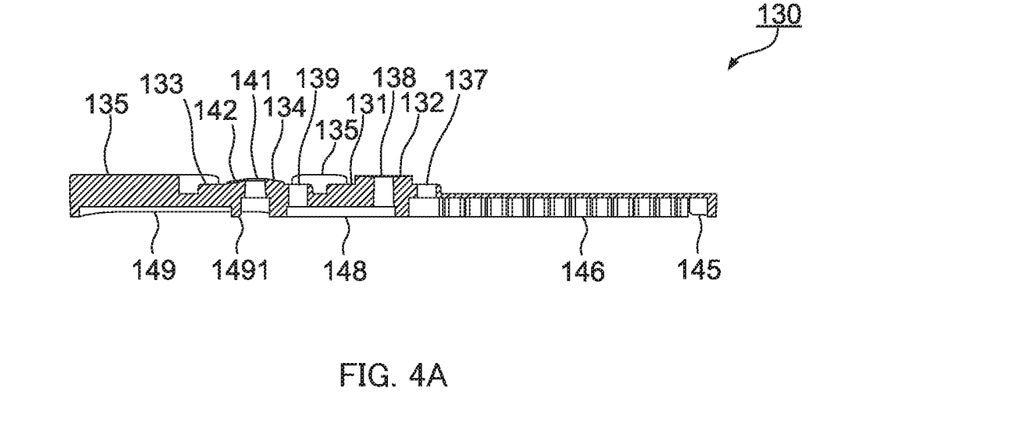
FIG. 4A is a cross-sectional view of the first member taken along line A-A of FIG. 3A.
Figure 4B:
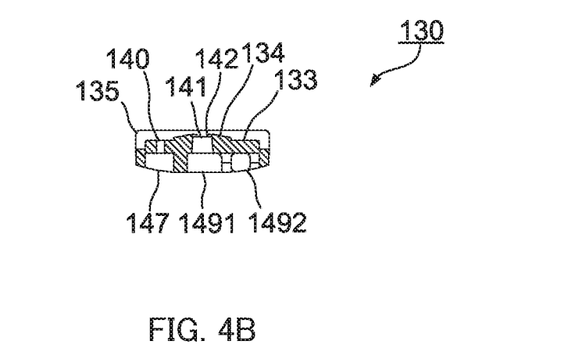
FIG. 4B is a cross-sectional view of the first member taken along line B-B of FIG. 3A.
Figure 4C:
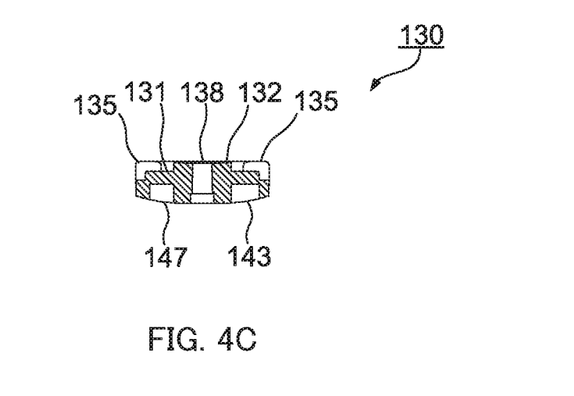
FIG. 4C is a cross-sectional view of the first member taken along line C-C of FIG. 3A.

FIG. 3A is a plan view of first member 130, FIG. 3B is a front view of first member 130, FIG. 3C is a bottom view of first member 130, and FIG. 3D is a right side view of first member 130. In addition, FIG. 4A is a cross-sectional view of first member 130 taken along line A-A of FIG. 3A, FIG. 4B is a cross-sectional view of first member 130 taken along line B-B of FIG. 3A, and FIG. 4C is a cross-sectional view of first member 130 taken along line C-C of FIG. 3A.

First member 130 is molded with a resin material, and has flexibility. Examples of the resin material include polyethylene such as linear low density polyethylene and high density polyethylen, polypropylene, silicone, and industrial materials having rubber elasticity, and the examples of the industrial materials having rubber elasticity include elastomer and rubber.

First member 130 has a substantially rectangular planar shape, and includes the bottom surface, a flat top surface, and one or more through holes. One or more protrusions are provided on the top surface, and one or more recesses and grooves are provided on the bottom surface.

Specifically, first member 130 includes first circular base part 131 protruding from a center portion of the top surface, first columnar part 132 protruding over a center portion of first circular base part 131, second circular base part 133 protruding from the top surface at a position on one end side relative to first circular base part 131 in the longitudinal direction of first member 130, second columnar part 134 protruding over a center portion of second circular base part 133, and a plurality of support base parts 135 protruding at positions in the top surface so as to surround first and second circular base parts 131 and 133 with a certain space therebetween.

In addition, first member 130 includes slit 136 opening at one side part on the other end side relative to first circular base part 131 and elongated in the longitudinal direction, first hole 137 opening at first circular base part 131, second hole 138 opening at a center portion of first columnar part 132, third hole 139 and fourth hole 140 opening at second circular base part 133, fifth hole 141 opening at a center portion of second columnar part 134, and groove 142 for communication between the periphery of the top surface of second columnar part 134 and fifth hole 141.

The protruding heights of first circular base part 131 and second circular base part 133 from the top surface are equal to each other. First columnar part 132 protrudes from first circular base part 131, and a gap is provided between the apex thereof and first film part 152. In addition, second columnar part 134 protrudes from second circular base part 133, and a gap is provided between the apex thereof and second film part 153. The protruding height of first columnar part 132 from first circular base part 131 is greater than the protruding height of second columnar part 134 from second circular base part 133, and the gap between first columnar part 132 and first film part 152 is smaller than the gap between second columnar part 134 and second film part 153.

The top surface of second columnar part 134 is an inclined surface whose height gradually increases from the periphery of second columnar part 134 toward the periphery of fifth hole 141. Groove 142 has a constant depth along the inclined surface except in the peripheral portion of second columnar part 134, and has an approximately horizontal bottom surface in the peripheral portion. Accordingly, groove 142 is formed such that, in the peripheral portion of second columnar part 134, the cross-sectional area of the groove gradually decreases toward the periphery.

At the edge of the top surface, support base part 135 protrudes from the top surface along the edge so as to form a wall part that is higher than first columnar part 132 and second columnar part 134 in first member 130.

In addition, first member 130 includes linear groove 143 extending along the longitudinal direction in one side part on the bottom surface, first pressure reduction channel part 144 continuously connected with the other end of groove 143, linear groove 145 continuously connected with the other end of first pressure reduction channel part 144 and extending in the short direction of first member 130, second pressure reduction channel part 146 continuously connected with one end of groove 145 and extending toward one end at a center portion of the bottom surface, third pressure reduction channel part 147 continuously connected with one end of groove 145 and extending toward one end at the other end portion of the bottom surface, linear groove 148 extending along the longitudinal direction on one end side relative to second pressure reduction channel part 146 on the bottom surface, and recess 149 formed on one end side relative to groove 143, groove 148 and third pressure reduction channel part 147 on the bottom surface.

Each of first pressure reduction channel part 144, second pressure reduction channel part 146 and third pressure reduction channel part 147 is a groove having a zigzag planar shape. The zigzag shape is a shape in which projections, each having a substantially triangular prism shape, are alternately disposed along the longitudinal direction from the side surfaces of the pressure reduction channel part, for example. In plan view, the projections are disposed such that the tip of each projection does not exceed the central axis between the side surfaces.

Slit 136 opens at the bottom surface of groove 143. First hole 137 opens at one end portion of second pressure reduction channel part 146. Second hole 138 opens at the other end portion of groove 148, and third hole 139 opens at one end portion of groove 148.

Fourth hole 140 opens at one end portion of third pressure reduction channel part 147. Fifth hole 141 opens at the other end portion of recess 149.

Recess 149 extends to one end portion of the bottom surface. Recess 149 includes first projection 1491 extending along the short direction at a position overlapping fifth hole 141 in the longitudinal direction, and second projection 1492 extending along the short direction at a position separated from first projection 1491 and the side wall of recess 149 on the extension of first projection 1491 in the short direction.

It is to be noted that, in plan view, the side wall surface of first member 130 is formed to have an inclination such that the bottom surface side is located on the slightly inside relative to the top surface side. That is, the side wall surface forms the undercut part described later.

Figure 5A:
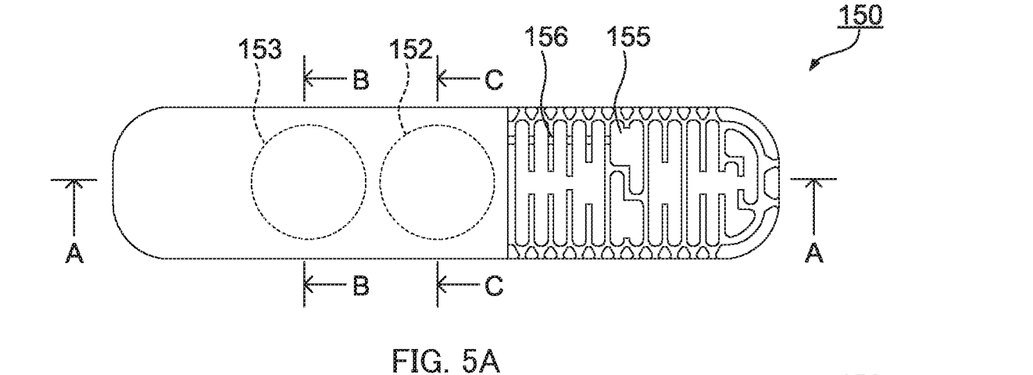
FIG. 5A is a plan view of a second member in the embodiment of the present invention.
Figure 5B:
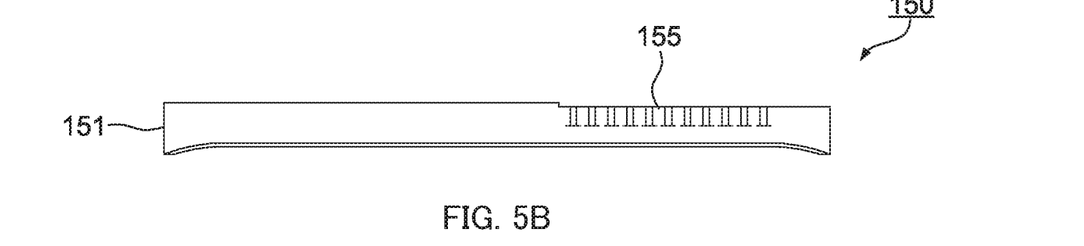
FIG. 5B is a front view of the second member.
Figure 5C:
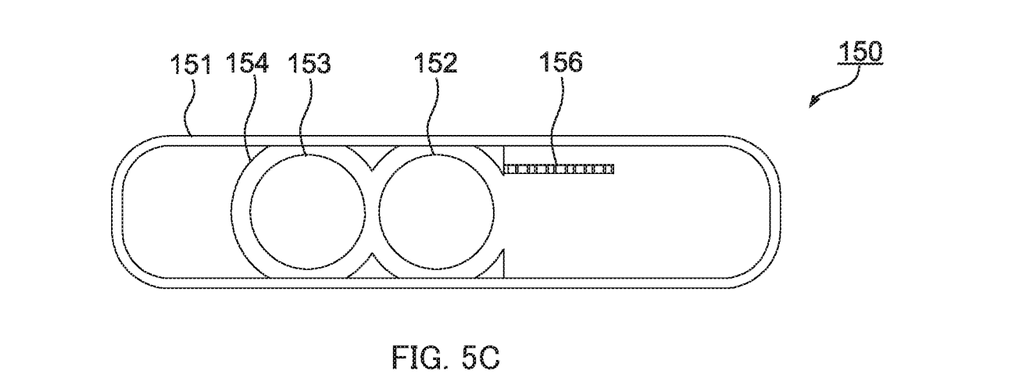
FIG. 5C is a bottom view of the second member.
Figure 5D:
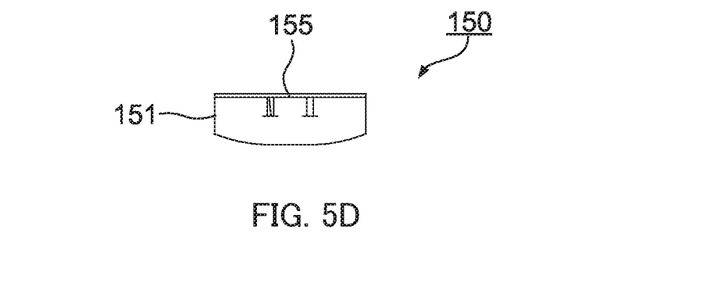
FIG. 5D is a right side view of the second member.
Figure 6A:
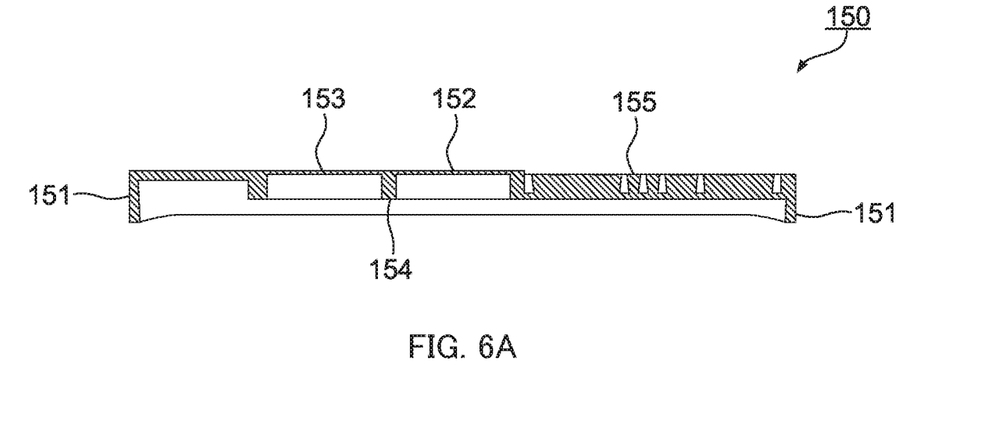
FIG. 6A is a cross-sectional view of the second member taken along line A-A of FIG. 5A.
Figure 6B:
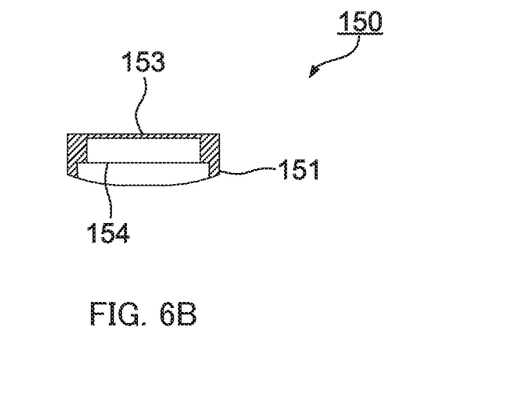
FIG. 6B is a cross-sectional view of the second member taken along line B-B of FIG. 5A.
Figure 6C:
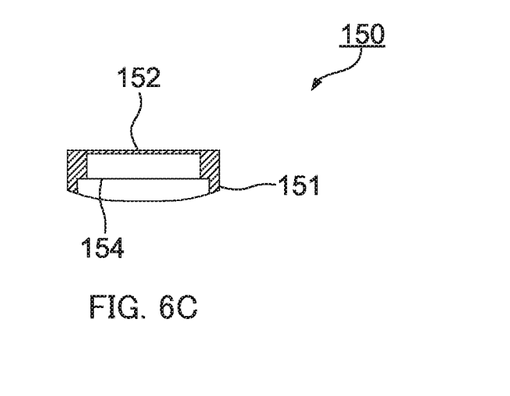
FIG. 6C is a cross-sectional view of the second member taken along line C-C of FIG. 5A.

FIG. 5A is a plan view of second member 150, FIG. 5B is a front view of second member 150, FIG. 5C is a bottom view of second member 150, and FIG. 5D is a right side view of second member 150. In addition, FIG. 6A is a cross-sectional view of second member 150 taken along line A-A of FIG. 5A, FIG. 6B is a cross-sectional view of second member 150 taken along line B-B of FIG. 5A, and FIG. 6C is a cross-sectional view of second member 150 taken along line C-C of FIG. 5A.

Second member 150 is also molded with a resin material, and has flexibility. Examples of the resin material include polyethylene such as linear low density polyethylene and high density polyethylen, polypropylene, silicone, and industrial materials having rubber elasticity, and the examples of the industrial materials having rubber elasticity include elastomer and rubber. The resin material of second member 150 may or may not be identical to that of first member 130.

Second member 150 has a substantially rectangular planar shape larger than that of first member 130, and includes a flat plate part disposed on the upper side of first member 130, and peripheral wall part 151 raised from the periphery of the rear surface (the surface on first member 130 side) of the flat plate part. The flat plate part includes first film part 152 disposed at a center portion in the longitudinal direction, second film part 153 disposed on one end of side thereof, frame part 154 surrounding first film part 152 and second film part 153 on the rear surface of the flat plate part, filter part 155 disposed on the other end side relative to first film part 152, and slit 156 disposed in filter part 155.

Peripheral wall part 151 is formed to surround the periphery of first member 130. In addition, in plan view, peripheral wall part 151 is formed to have an inclination such that the tip end of the inner wall surface is located on the slightly inside relative to the flat plate part side (base end) of the inner wall surface. That is, peripheral wall part 151 of second member 150 forms the undercut part described later.

First film part 152 and second film part 153 are a thin part in the flat plate part of second member 150. First film part 152 and second film part 153 are disposed in the top surface of the flat plate part, and formed by columnar recesses further recessed from the rear surface of the flat plate part. The thickness of each of first and second film parts 152 and 153 is 0.3 mm, for example.

Frame part 154 is a protrusion that has a predetermined width and surrounds first film part 152 and second film part 153. The protruding height of frame part 154 from the rear surface of the flat plate part is equal to the protruding height of support base part 135 from the top surface of first member 130, and the width of frame part 154 is equal to the distance between support base part 135, and first and second circular base parts 131 and 133 of first member 130.

Filter part 155 is micro protrusions and recessions formed in the top surface of second member 150, and roughly speaking, filter part 155 includes a U-shaped first groove extending along the other end edge of second member 150, a plurality of second grooves extending outward from the first groove so as to communicate between the first groove and the outside, and a plurality of third grooves extending inward from the first groove. Mainly, the third grooves separately extend in the short direction of the second member 150, and some of the third grooves communicate with each other.

Slit 156 is a through hole opening in one side part of second member 150 and extending in a slender shape along the longitudinal direction. On the top surface side of the flat plate part, slit 156 opens at the bottoms of the plurality of third grooves of filter part 155.

Figure 7A:
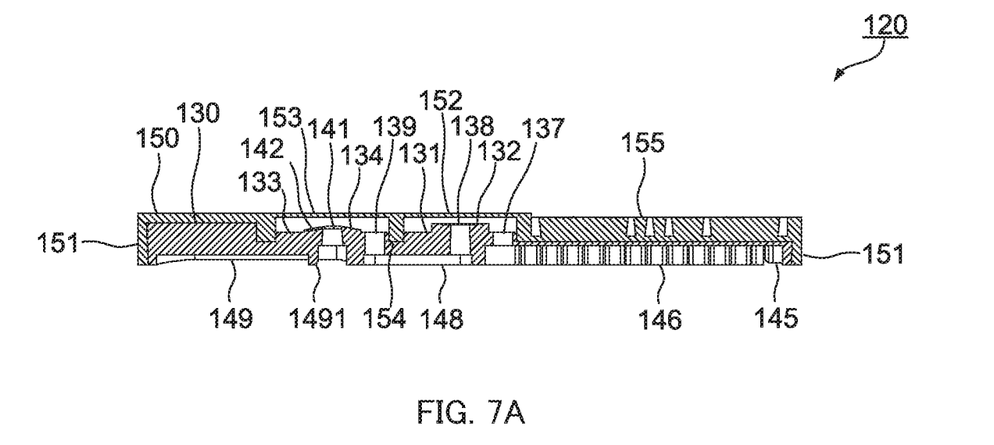
FIG. 7A is a cross-sectional view of the emitter taken along line A-A of FIG. 2A.
Figure 7B:
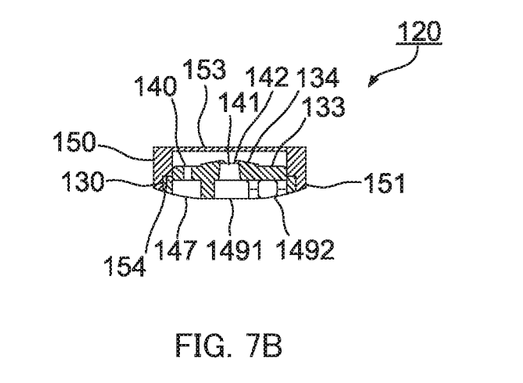
FIG. 7B is a cross-sectional view of the emitter taken along line B-B of FIG. 2A.
Figure 7C:
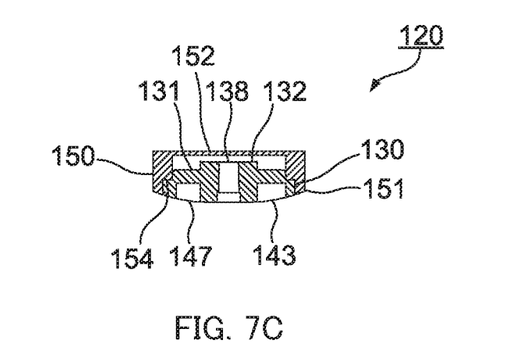
FIG. 7C is a cross-sectional view of the emitter taken along line C-C of FIG. 2A.

FIG. 7A is a cross-sectional view of emitter 120 taken along line A-A of FIG. 2A, FIG. 7B is a cross-sectional view of emitter 120 taken along line B-B of FIG. 2A, and FIG. 7C is a cross-sectional view of emitter 120 taken along line C-C of FIG. 2A.

Emitter 120 is assembled by putting second member 150 onto first member 130 from the upper surface side of first member 130, and by coupling peripheral wall part 151 of second member 150 onto the periphery of first member 130 from the outside.

At the time of the above-mentioned coupling, the tip end of peripheral wall part 151 advances to the periphery of the bottom surface of first member 130. As described above, in plan view, the side wall surface of first member 130 and the inner wall surface of peripheral wall part 151 of second member 150 are slightly tilted toward the center. Accordingly, in the plane direction, the side wall surface of first member 130 located on the inner side projects most outward at the upper end edge thereof, and the inner wall surface of peripheral wall part 151 of second member 150 located on the outer side projects most inward at the tip end thereof. With this configuration, in the backward direction (the direction opposite to the advancing direction of the tip end of peripheral wall part 151) of second member 150, the inner wall surface of peripheral wall part 151 of second member 150 is brought into contact with the side wall surface of first member 130, and thus removal of second member 150 from first member 130 is restricted. In this manner, the side wall surface of first member 130 and the inner wall surface of peripheral wall part 151 of second member 150 are locked to each other in the backward direction, and serve as undercut parts for each other. Thus, second member 150 is firmly coupled with first member 130 in a sufficient manner.

Frame part 154 of second member 150 is coupled with first circular base part 131 and second circular base part 133 of first member 130 from the outside. First film part 152 is disposed at a position where first film part 152 can make contact with the top surface of first columnar part 132 when first film part 152 is deflected to first member 130 side, and second film part 153 is disposed at a position where second film part 153 can make contact with the top surface of second columnar part 134 when second film part 153 is deflected to first member 130 side. The flow rate adjusting part is configured by coupling frame part 154 to first circular base part 131 from the outside, and the discharge rate adjusting part is configured by coupling frame part 154 to second circular base part 133 from the outside.

In addition, slit 156 of second member 150 is connected with slit 136 of first member 130. In this manner, groove 143 of first member 130 is communicated with the third groove of second member 150.

Emitter 120 is joined to the inner wall surface of tube 110 by fusing, for example. When coupled to first member 130 from the outside, peripheral wall part 151 of second member 150 reaches the periphery of the bottom surface of first member 130, and therefore, when emitter 120 is joined in the above-mentioned manner, both the bottom surface of first member 130 and the tip end of peripheral wall part 151 of second member 150 are joined to the inner wall surface of tube 110. When the bottom surface of first member 130 is joined to the inner wall surface of tube 110, the recess and the groove formed on the bottom surface of first member 130 are closed with the inner wall surface of tube 110, and thus an the channel of the irrigation liquid is formed. In this manner, first to third pressure reduction channel parts 144, 146 and 147 respectively form the first to third pressure reduction channels configured to carry irrigation liquid while reducing the pressure of the irrigation liquid, groove 145 forms a branch channel configured to branch off from the first pressure reduction channel to the second or third pressure reduction channel, groove 148 forms a communication channel configured to supply the irrigation liquid discharged from the flow rate adjusting part to the discharge rate adjusting part, and recess 149 forms a discharging part configured to house the supplied irrigation liquid and face discharging port 112.

Next, a hole is opened in tube 110 at a position corresponding to recess 149 of first member 130 to form discharging port 112. Alternatively, emitter 120 is joined on the inner wall surface of tube 110 at a position where recess 149 covers discharging port 112 formed in advance. In this manner, drip irrigation tube 100 is configured as illustrated in FIG. 1A.

The irrigation liquid in tube 110 passes through slits 156 and 136 via the groove of filter part 155 so as to be supplied to groove 143. In this manner, filter part 155 and slit 156 serve as a liquid intake part for intake of the irrigation liquid in tube 110. Floating matters in the irrigation liquid in tube 110 cannot enter the groove of filter part 155, and thus irrigation liquid from which the floating matters are removed is supplied to the liquid intake part. It is to be noted that the irrigation liquid is water, liquid fertilizer, agricultural chemical, or a mixture thereof, for example.

Through the first pressure reduction channel, the irrigation liquid is supplied to the branch channel while the pressure of the irrigation liquid is reduced. A part of the irrigation liquid supplied to the branch channel passes through the second pressure reduction channel while the pressure thereof is further reduced, so as to be supplied to the flow rate adjusting part, the communication channel, and the discharge rate adjusting part. In addition, the remaining part of the irrigation liquid supplied to the branch channel passes through the third pressure reduction channel while the pressure thereof is further reduced, so as to be supplied to the discharge rate adjusting part. The irrigation liquid supplied to the discharge rate adjusting part is supplied to the discharging part, and discharged from discharging port 112 at a desired flow rate.

In the case where no specific flow rate control is performed, when the pressure (outer liquid pressure) of the irrigation liquid in tube 110 increases, the flow rate of the irrigation liquid that passes through emitter 120 increases with the increase of the pressure, and the discharge rate of the irrigation liquid from discharging port 112 increases.

Now the adjustment of the flow rate of the irrigation liquid in the discharge rate adjusting part and the flow rate adjusting part of emitter 120 is described in more detail. The irrigation liquid supplied to the branch channel passes through the second pressure reduction channel or the third pressure reduction channel. The second pressure reduction channel is shorter than the third pressure reduction channel, and accordingly the pressure drop at the second pressure reduction channel is smaller than the pressure drop at the third pressure reduction channel. Accordingly, the second pressure reduction channel is prioritized in flow of the irrigation liquid.

The irrigation liquid flowing through the second pressure reduction channel passes through first hole 137 and fills a space closed with first circular base part 131 and first film part 152, and is then supplied to the communication channel through second hole 138 opening at the apex of first columnar part 132. First film part 152, which has flexibility, is deflected by the outer liquid pressure, and brought close to the apex of first columnar part 132, and, along with this change, the flow rate of the irrigation liquid at second hole 138 decreases. Then, when the outer liquid pressure is a first preset value (for example, 0.02 MPa), first film part 152 makes close contact with the apex of first columnar part 132 to seal second hole 138, and close the channel of the irrigation liquid.

When the outer liquid pressure decreases, first film part 152 is again separated from the apex of first columnar part 132, and the flow rate of the irrigation liquid at second hole 138 increases. Thus, the flow rate adjusting part adjusts the flow rate of the irrigation liquid in emitter 120 in such a manner as to suppress excessive increase of the flow rate of the irrigation liquid in emitter 120 due to the increase of the outer liquid pressure when the outer liquid pressure is relatively low.

The irrigation liquid flowing through the communication channel, and the irrigation liquid flowing through the third pressure reduction channel are supplied to the space closed with second circular base part 133 and second film part 153 through third hole 139 and fourth hole 140, respectively, so as to fill the space, and are supplied to the discharging part through fifth hole 141 opening at the apex of second columnar part 134. Second film part 153, which also has flexibility, is deflected by the outer liquid pressure, and brought close to the apex of second columnar part 134, and, along with this change, the flow rate of the irrigation liquid at fifth hole 141 decreases.

When the outer liquid pressure is a second preset value (for example, 0.05 MPa), second film part 153 makes close contact with the opening edge of fifth hole 141. Since groove 142 is formed at the apex of second columnar part 134, the flow rate of the irrigation liquid at fifth hole 141 is controlled to a flow rate of the irrigation liquid which passes through groove 142.

When the outer liquid pressure further increases to a third preset value (for example, 0.1 MPa), second film part 153 is brought into close contact with the apex of second columnar part 134 as the pressure increases so as to be brought into close contact with the entirety of the apex of second columnar part 134 except in the peripheral portions thereof. At this time, since the depth of groove 142 at the apex of second columnar part 134 is constant, the flow rate of the irrigation liquid at fifth hole 141 is still controlled to the flow rate of the irrigation liquid which passes through groove 142.

When the outer liquid pressure further increases to a fourth preset value (for example, 0.2 MPa), second film part 153 is gradually brought into close contact with the peripheral portion of second columnar part 134. At this time, since the depth of groove 142 gradually decreases toward the periphery of second columnar part 134, the flow rate of the irrigation liquid at fifth hole 141 further decreases in accordance with the depth of groove 142. Then, when second film part 153 is brought into close contact with the edge of second columnar part 134, the flow rate is controlled to a flow rate corresponding to the minimum depth (opening area) of groove 142 at the edge. In this manner, the discharge rate adjusting part operates such that the cross-sectional area of the channel of the irrigation liquid decreases with the increase of the outer liquid pressure, thereby adjusting the flow rate of the irrigation liquid from discharging port 112 to a desired flow rate regardless of the value of the outer liquid pressure.

When the outer liquid pressure decreases, second film part 153 is separated from the apex of second columnar part 134, and the flow rate of the irrigation liquid at fifth hole 141 increases. In this manner, the discharge rate adjusting part operates such that the cross-sectional area of the channel of the irrigation liquid decreases with the increase of the outer liquid pressure, thereby adjusting the flow rate of the irrigation liquid in emitter 120 in such a manner as to suppress the large variation, from a desired flow rate, of the flow rate of the irrigation liquid in emitter 120 due to the increase of the outer liquid pressure when the outer liquid pressure is relatively high.

The flow rate of the irrigation liquid at the flow rate adjusting part can be adjusted by the length of the second pressure reduction channel, the clearance between first film part 152 and the apex of first columnar part 132, and the like. In addition, the flow rate of the irrigation liquid at the discharge rate adjusting part can be adjusted by the length of the third pressure reduction channel, the clearance between second film part 153 and the apex of second columnar part 134, the width, the depth and the number of groove 142, and the like.

As described above, emitter 120 adjusts the flow rate of the irrigation liquid in emitter 120 so that the flow rate is at a desired flow rate regardless of the outer liquid pressure. Therefore, drip irrigation tube 100 discharges the irrigation liquid at a desired flow rate from each discharging port 112. When in use, foreign matters such as soil and plant roots might enter drip irrigation tube 100 from discharging port 112. Such entry of foreign matters is blocked by first projection 1491 and second projection 1492 disposed in recess 149. It is thus possible to prevent variation in flow rate such as stoppage of supply of the irrigation liquid and reduction in flow rate of the irrigation liquid due to the entry of the foreign matters.

As is clear from the above description, emitter 120 includes a liquid intake part for intake of the irrigation liquid in tube 110, first to third pressure reduction channel parts 144, 146 and 147 for forming a liquid pressure reduction channel configured to carry irrigation liquid taken by the liquid intake part while reducing the pressure of the irrigation, a discharge rate adjusting part including second film part 153 configured to receive the pressure of the irrigation liquid in tube 110, the discharge rate adjusting part being configured to control, with second film part 153 that is deformed by the pressure of the irrigation liquid in tube 110, the flow rate of the irrigation liquid supplied from the pressure reduction channel, and a discharging part configured to house the irrigation liquid supplied from the discharge rate adjusting part and face discharging port 112.

Emitter 120 is configured with first member 130 and second member 150. First member 130 includes the discharging part and is configured to be joined on the inner wall surface of tube 110, and second member 150 includes second film part 153 and is capable of being coupled to first member 130. At the time of coupling to first member 130, second member 150 advances to a position where second member 150 can be partially joined to the inner wall surface of tube 110. In emitter 120, the discharge rate adjusting part is configured when second member 150 is coupled to first member 130.

In general, emitter 120 is produced by injection molding of resin. In the case where two or more components are produced by injection molding, when the resin portions of these components have similar volumes, thicknesses and/or sizes, the components can be produced with high accuracy and high productivity since the shapes are similar to each other and/or the injection conditions of the resin can be easily uniformized. Emitter 120 is produced by coupling first member 130 and second member 150 having approximately equal sizes and structures, and therefore both first member 130 and second member 150 can be produced with high accuracy, and accordingly, emitter 120 can be produced with high assembling accuracy. This is advantageous in manufacture high-performance emitter 120 with a high yield. Thus, emitter 120 can be stably produced with two or more components.

It is to be noted that, in the coupled state, the tip end of peripheral wall part 151 of second member 150 reaches the position of the edge of the bottom surface of first member 130. Such a configuration in which the end position in the advancing direction for coupling of second member 150 is the same as the position of the joining part of first member 130 is advantageous in terms of directly joining both first member 130 and second member 150 on the inner wall surface of tube 110, and sufficiently increasing the joining strength of emitter 120 to the inner wall surface. However, the position of the advancement end at the time of coupling of second member 150 may be shifted from the joint position of first member 130 in the advancing direction to a certain degree as long as both first member 130 and second member 150 can be joined to tube 110 and a desired function of the inner structures (such as the pressure reduction channel) of emitter 120 is ensured. For example, in the case where both first member 130 and second member 150 are directly joined on the inner wall surface of tube 110, the position of the advancement end of second member 150 may be located at a position within a range of ±0.2 mm from the joint position of first member 130 (bottom surface edge) in the advancing direction.

While second member 150 of emitter 120 can be coupled with the side part of first member 130 and such a coupling structure is advantageous in sufficiently and firmly joining not only first member 130 but also second member 150 to the inner wall surface of tube 110, the way of the coupling between first member 130 and second member 150 is not limited to this. For example, first member 130 may include one or more holes for coupling, and second member 150 may include one or more dowels to be inserted to the holes. Also with such a coupling structure, by jointing emitter 120 to the inner wall surface of tube 110, both first member 130 and second member 150 can be directly and firmly joined to the inner wall surface in a sufficient manner.

In addition, in emitter 120, second member 150 further includes an undercut part for the first member 130, and the configuration including such an undercut part is advantageous in sufficiently increasing the coupling strength between first member 130 and second member 150. In particular, the undercut part is advantageous in increasing the assembling accuracy and the coupling strength without sacrificing the assembling efficiency in the case where at least second member 150 has flexibility. Alternatively, for example, by coupling second member 150 to first member 130 such that second member 150 has a larger contact area with first member 130, the coupling strength can be sufficiently increased without complicating the assembling.

In addition, in emitter 120, first member 130 includes the pressure reduction channel part, and second member 150 includes the liquid intake part. While such a configuration is advantageous in view of equalize the capacities and the sizes of the resin parts of first member 130 and second member 150, the components of first member 130 and second member 150 may be appropriately determined in accordance with the structure of emitter 120. For example, the pressure reduction channel part may be disposed in second member 150 in part or in whole, or may be disposed in both first member 130 and second member 150 such that the pressure reduction channel is formed when first member 130 and second member 150 are coupled to each other. In addition, filter part 155 and slit 156 may be further disposed in first member 130.

In addition, emitter 120 further includes the flow rate adjusting part. This is further advantageous in adjusting the discharge rate to a desired amount in the case where the outer liquid pressure is low.

In addition, a so-called wedge wire structure in which the side walls of the first to third grooves in filter part 155 are undercut parts is preferable since such a configuration is further advantageous in suppressing clogging at filter part 155. The configuration in which second member 150 has flexibility is advantageous in view of configuring such filter part 155.

In addition, drip irrigation tube 100 includes tube 110 including discharging port 112 for discharging irrigation liquid, and emitter 120 joined at a position corresponding to discharging port 112 on the inner wall surface of tube 110. Since emitter 120 can be stably produced with two or more components as described above, drip irrigation tube 100 can also be stably produced.

It is to be noted that emitter 120 has a configuration in which the gap between first columnar part 132 and first film part 152 is smaller than the gap between second columnar part 134 and second film part 153, and with this configuration, the flow rate adjusting part operates (the channel of the irrigation liquid is closed) before the discharge rate adjusting part operates. The order of the operations of the flow rate adjusting part and the discharge rate adjusting part, the set value of the outer liquid pressure for the operations, and the like may be adjusted also by the difference in flexibility between first film part 152 and second film part 153, as well as the sizes of the gaps. For example, when the thickness of first film part 152 is set to a value smaller than that of second film part 153 such that the flexibility of first film part 152 is higher than that of second film part 153, the gap between first columnar part 132 and first film part 152 can be set to a value equal to or greater than that of the gap between second columnar part 134 and second film part 153.

In addition, other than emitter 120, it is possible to employ, as the emitter according to the present embodiment, an emitter including a film part that functions as a diaphragm configured to adjust the flow rate of the irrigation liquid to the discharging part under the pressure of the irrigation liquid in tube 110, in which the emitter can be configured with a first member (including a joining part having a larger area) that is mainly joined to the inner wall surface of the tube, and a second member that can be coupled with the first member and includes the film part.

This disclosure of Japanese Patent Application No. 2015-167504, filed on Aug. 27, 2015, including the specification, drawings and abstract, is incorporated herein by reference in its entirety.

INDUSTRIAL APPLICABILITY

According to the present invention, it is possible to provide, with high productivity, an emitter which can drop liquid with an appropriate rate by the pressure of the liquid to be dropped. Accordingly, popularization of the emitter in the technical fields of drip irrigations and endurance tests where long-term dropping is required, and development in the technical fields can be expected.

REFERENCE SIGNS LIST

100 Drip irrigation tube
110 Tube

112 Discharging port
120 Emitter
130 First member
131 First circular base part
132 First columnar part
133 Second circular base part
134 Second columnar part
135 Support base part
136, 156 Slit
137 First hole
138 Second hole
139 Third hole
140 Fourth hole
141 Fifth hole
142, 143, 145, 148 Groove
144 First pressure reduction channel part
146 Second pressure reduction channel part
147 Third pressure reduction channel part
149 Recess
150 Second member
151 Peripheral wall part
152 First film part
153 Second film part
154 Frame part
155 Filter part
1491 First projection
1492 Second projection

The invention claimed is:

1. An emitter configured to be joined to an inner wall surface of a tube for carrying irrigation liquid at a position corresponding to a discharging port for communicating between inside and outside of the tube, the emitter being configured to quantitatively discharge the irrigation liquid in the tube from the discharging port to the outside of the tube, the emitter composed of:
   two molded members, the two molded members being a first member and a second member, wherein:
   the first member includes:
      a pressure reduction channel part configured to form a pressure reduction channel configured to carry the irrigation liquid taken by a liquid intake part while reducing a pressure of the irrigation liquid, and
      a discharging part configured to house the irrigation liquid supplied from a discharge rate adjusting part, the discharging part being configured to face the discharging port,
   wherein the first member is configured to be joined to the inner wall surface of the tube, and the pressure reduction channel part is disposed on a bottom surface of the first member, the bottom surface being a surface to be joined to inner wall surface of the tube, and
   the second member includes:
      the liquid intake part configured for intake of the irrigation liquid in the tube, and
      a film part configured to receive the pressure of the irrigation liquid in the tube,
   wherein:
      the discharge rate adjusting part is configured to control a flow rate of the irrigation liquid supplied from the pressure reduction channel by the film part that is deformed by the pressure of the irrigation liquid in the tube,
      the second member is configured to be coupled to the first member,
      when the second member is coupled to the first member, the second member advances to a position where a part of the second member is to be joined to the inner wall surface of the tube,
      the film part is integrated with the second member,
      an entirety of the second member including the film part is integrally molded with one material, and
      the discharge rate adjusting part is formed when the second member is coupled with the first member.

2. The emitter according to claim 1, wherein the second member is configured to be coupled onto a side part of the first member from an outside.

3. The emitter according to claim 1, wherein the first member and/or the second member further include an undercut part configured to lock the second member to the first member in a direction opposite to a direction in which the second member advances when the second member is coupled to the first member.

4. A drip irrigation tube comprising:
   a tube including a discharging port configured to discharge irrigation liquid; and
   an emitter according to claim 1 that is joined on an inner wall surface of the tube at a position corresponding to the discharging port.

* * * * *